DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MAY 1, 1973

910 O.G. 7

T910,002
PHOTOGRAPHIC BLEACH COMPOSITIONS
Lynn R. Hotter, 1669 Lake Ave., Rochester, N.Y. 14650
Filed Feb. 22, 1972, Ser. No. 228,386
Int. Cl. G03c *5/32*
U.S. Cl. 96—60
No Drawing. 10 Pages Specification

Solutions containing (1) a trivalent iron complex of an aminopolycarboxylic acid, such as ammonium ferric ethylenediamine tetraacetate, and (2) an alkali metal or ammonium bromide or iodide salt are effective bleach solutions for use in color photographic processes. Following use of such bleach solutions to oxidize photographic silver images and removal of the oxidation products from the photographic element with a thiosulfate fixing solution, the silver can be recovered in high yield from the fixing solution using conventional electrolytic methods of silver recovery. This is an important advantage as compared to known bleach-fix compositions containing a trivalent iron complex of an aminopolycarboxylic acid as a bleaching agent and a thiosulfate as a fixing agent since it is difficult to recover silver from such bleach-fix solutions by electrolytic means because of the presence of iron salts. The level of bromide or iodide salt in the bleach solution should be such that substantially no fixing occurs but substantial conversion of silver to silver halide occurs. Preferably, the bleach solution should contain about 30 to about 400 grams of the iron complex and about 3 to about 20 grams of iodide salt or about 50 to about 350 grams of bromide salt per liter.